(12) United States Patent
Haymond

(10) Patent No.: US 9,897,818 B2
(45) Date of Patent: Feb. 20, 2018

(54) OCULAR FRAME FOR STEREOSCOPIC IMAGE VIEWER

(71) Applicant: Handstands Promo, LLC., Alpine, UT (US)

(72) Inventor: Bryce Haymond, Draper, UT (US)

(73) Assignee: Handstands Promo, LLC, Alpine, UT (US)

( * ) Notice: Subject to any disclaimer, the term of this patent is extended or adjusted under 35 U.S.C. 154(b) by 50 days.

(21) Appl. No.: 15/249,734

(22) Filed: Aug. 29, 2016

(65) Prior Publication Data

US 2017/0097512 A1    Apr. 6, 2017

Related U.S. Application Data

(60) Provisional application No. 62/237,845, filed on Oct. 6, 2015.

(51) Int. Cl.
*G02B 27/22* (2006.01)

(52) U.S. Cl.
CPC ................ *G02B 27/2257* (2013.01)

(58) Field of Classification Search
CPC .................................... G02B 27/2257
USPC .................................. 359/462–477
See application file for complete search history.

(56) References Cited

U.S. PATENT DOCUMENTS

| 9,405,126 | B1 | 8/2016 | Margolin |
| 2015/0370082 | A1* | 12/2015 | Choi ................. G02B 27/027 359/463 |
| 2016/0209658 | A1 | 7/2016 | Zalewski |

FOREIGN PATENT DOCUMENTS

| CN | 205377946 U | 7/2016 |
| KR | 20140054705 A | 5/2014 |
| KR | 10-1551217 B1 | 9/2015 |
| KR | 20160022641 A | 3/2016 |
| WO | WO 2015131648 A1 | 9/2015 |

OTHER PUBLICATIONS

Goggletech, "C1-Glass 3 colors", retrieved from <https://goggletech.net/index.php?route=product/product&path=33&product_id=51> on Aug. 9, 2016, 4 pages.
Google Tech, "Google Tech C1 Glass, Go4D VR and Go4D World", *YouTub*, <https://www.youtube.com/watch?v=5emDHs8seek>, Feb. 16, 2015.
Google, "Google Cardboard—Official VR Headsets—Google Store", retrieved from <https://store.google.com/product/google_cardboared?utm_source=google-cardboard&utm_medium=MS&utm_campaign=Google_Cardboard> on Aug. 9, 2016, 5 pages.

(Continued)

*Primary Examiner* — Bumsuk Won
*Assistant Examiner* — Collin X Beatty
(74) *Attorney, Agent, or Firm* — Thorpe, North & Western, LLP

(57) ABSTRACT

A stereoscopic image viewer comprises a frame to be physically coupled to a handheld electronic device. The frame comprises a face plate having a pair of lens sockets with a pair of lenses, and a pair of side arms with a pair of slots to receive the handheld electronic device. The lenses can be coupled in the sockets by twist-to-lock couplings. A forehead pad comprising a squat dome is disposed on the face plate.

19 Claims, 9 Drawing Sheets

(56) References Cited

OTHER PUBLICATIONS

Oculus, "Oculus Gear VR", retrieved from <https://www3.oculus.com/en-us/gear-vr/> on Dec. 20, 2016, 11 pages.
Oculus, "Oculus Rift | Oculus", retrieved from <https://www3.oculus.com/en-us/rift/> on Dec. 20, 2016, 19 pages.
Paterson, Steven, "Goggletech Go4D C1-Glass VR Glasses Review", VRCircle, Jun. 3, 2015, 7 pages, retrieved from <http://www.vrcircle.com/post/goggletech-go4d-c1-glass-vr-glasses-review1> on Dec. 20, 2016.

* cited by examiner

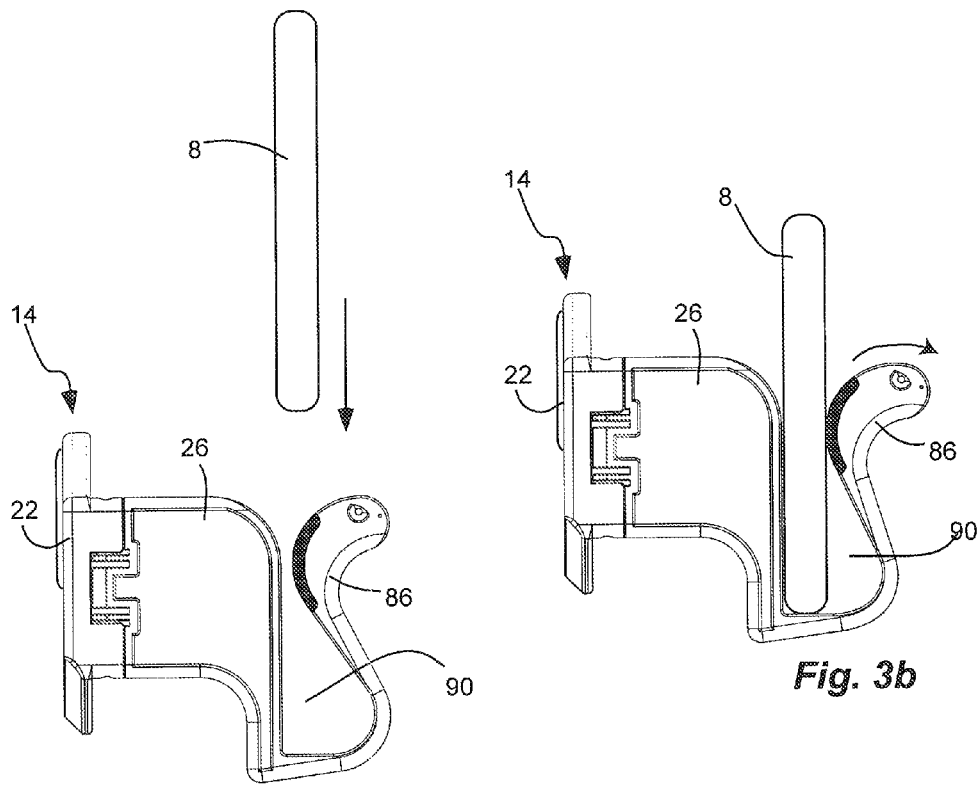
Fig. 3a
Fig. 3b
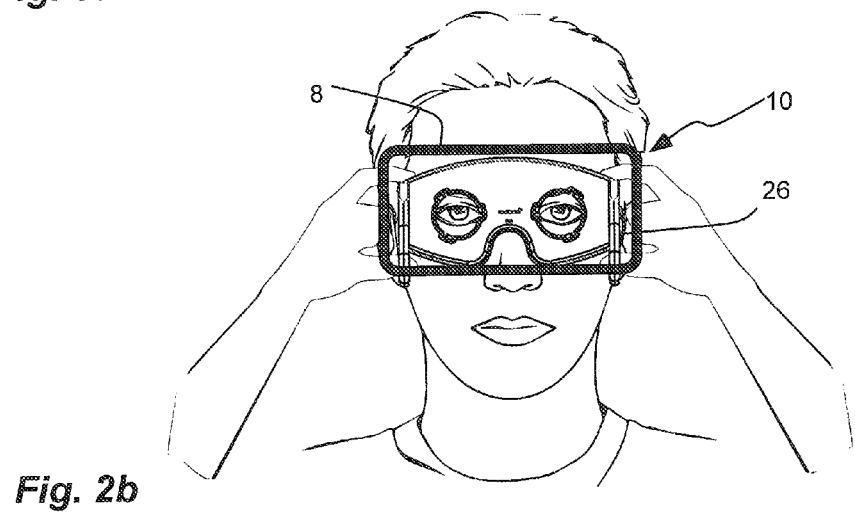
Fig. 2b

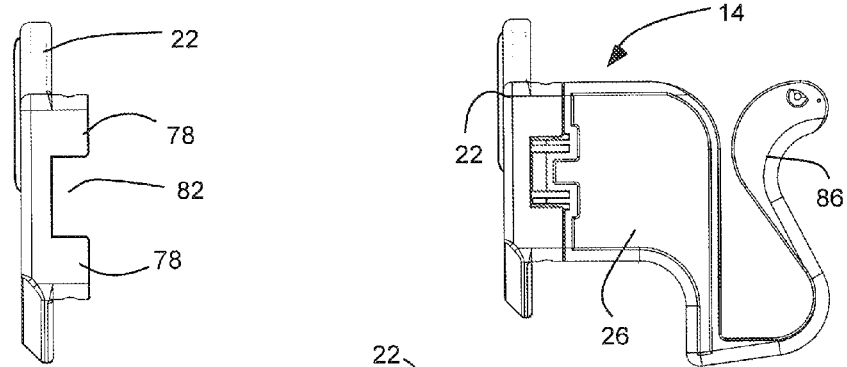
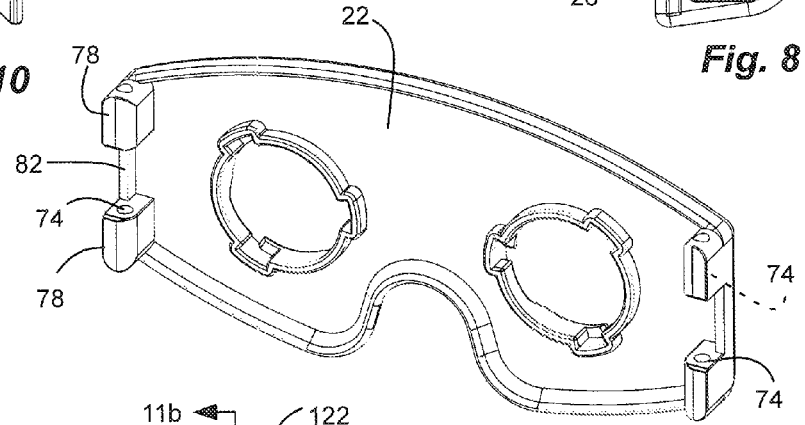
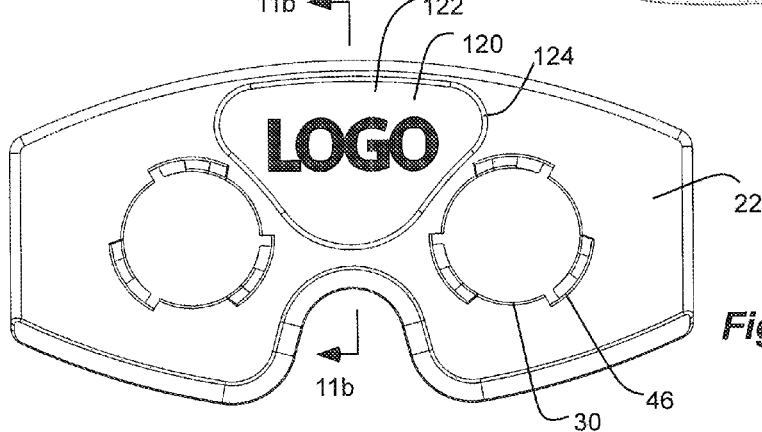
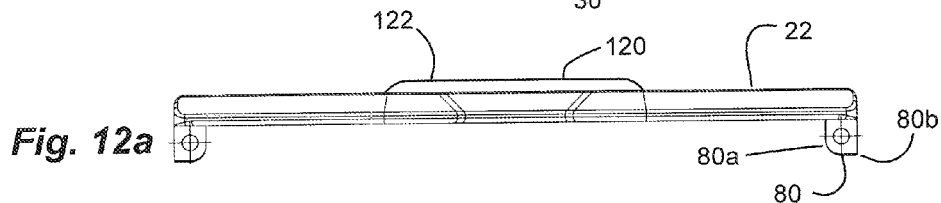

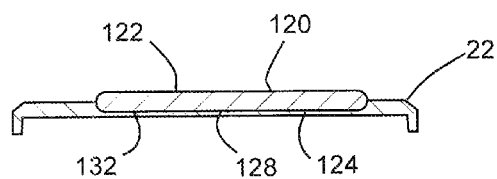
*Fig. 11b*
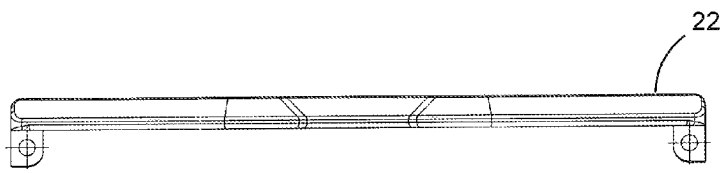
*Fig. 12b*
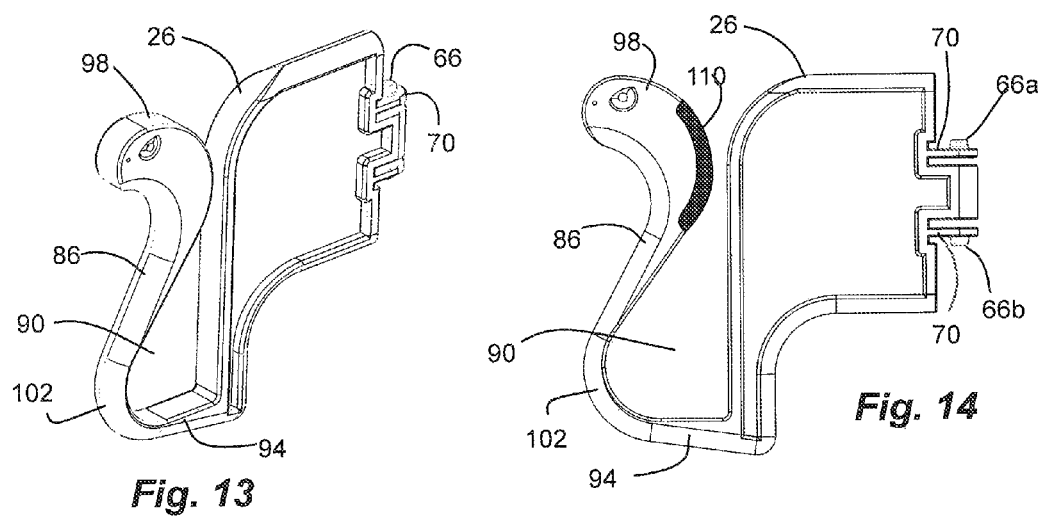
*Fig. 13*  *Fig. 14*

OCULAR FRAME FOR STEREOSCOPIC IMAGE VIEWER

PRIORITY CLAIM

Priority is claimed to U.S. Provisional Patent Application Ser. No. 62/237,845, filed Oct. 6, 2015, which is hereby incorporated herein by reference in its entirety.

BACKGROUND

Field of the Invention

The present invention relates generally to a stereoscopic image viewer.

Related Art

Stereoscopy creates the illusion of three-dimensional depth from two-dimensional images. Stereoscopies is a technique for creating or enhancing the illusion of depth in an image by means presenting two offset images separately to the left and right eye of the viewer. These two-dimensional images are then combined by the brain to give the perception of three-dimensional depth. Virtual reality head mounted displays have been proposed in which a pair of displays and a pair of lenses are carried by headset goggles. Simpler viewers have been proposed which utilize a viewer's existing cell phone for the display. For example, see the Google Cardboard, and the Google Tech Go4d C1-glass.

SUMMARY OF THE INVENTION

It has been recognized that it would be advantageous to develop a simple, but quality, stereoscopic image viewer for use with a handheld electronic device such as a cellular phone).

The invention provides a stereoscopic image viewer device comprising a frame configured to be physically coupled to a handheld electronic device having a display screen. The frame comprises a face plate having a pair of lens sockets and a nose indentation. A pair of lenses is carried in the pair of lens sockets of the face plate. A pair of side arms is coupled to the face plate and has a pair of slots configured to receive the handheld electronic device. A forehead pad comprising a squat dome is formed of a different material than the face plate and is disposed on the face plate opposite the pair of arms. The dome has a broad, flat shape with an outfacing surface with a flat and smooth center surrounded by a radius perimeter.

In addition, the invention provides a stereoscopic image viewer device comprising a frame configured to be physically coupled to a handheld electronic device having a display screen. The frame comprises a face plate having a pair of lens sockets and a nose indentation. A pair of lenses is carried in the pair of lens sockets of the face plate. Each of the pair of sockets and each of the pair of lenses has a twist-to-lock coupling. The twist-to-lock coupling comprises: 1) tabs extending radially from a perimeter of the lens and spaced-apart around a circumference of the lens; 2) notches extending radially into a perimeter of the socket and extending axially into the faceplate and spaced-apart around a circumference of the socket, and corresponding to the tabs of the lens, each notch having a floor facing axially with respect to the socket; and 3) undercuts extending circumferentially from the notches, each notch having a ceiling formed by the undercut facing opposite the floor. The tabs of the lens are insertable into the notches axially and turned radially so that each tab is held between the ceiling and the floor of the notch.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 2b is a front schematic view of the stereoscopic image viewer system of FIG. 1;

FIG. 3a is a side schematic view of the frame of FIG. 1 receiving the handheld electronic device;

FIG. 3b is a side view of the stereoscopic image viewer system of FIG. 1;

FIG. 8 is a side view of the frame of FIG. 1;

FIG. 9 is a rear perspective view of a faceplate of the frame of FIG. 1;

FIG. 10 is a side view of the faceplate of the frame of FIG. 1;

FIG. 11a is a front view of the faceplate of the frame of FIG. 1;

FIG. 11b is a cross-sectional side view of the faceplate of the frame of FIG. 1, taken along line 11b of FIG. 11a;

FIG. 12a is a bottom view of the faceplate of the frame of FIG. 1;

FIG. 12b is a bottom view of the faceplate of the frame of FIG. 1;

FIG. 13 is a perspective view of a side arm of the frame of FIG. 1;

FIG. 14 is a side view of the side arm of the frame of FIG. 1;

Figure 1:
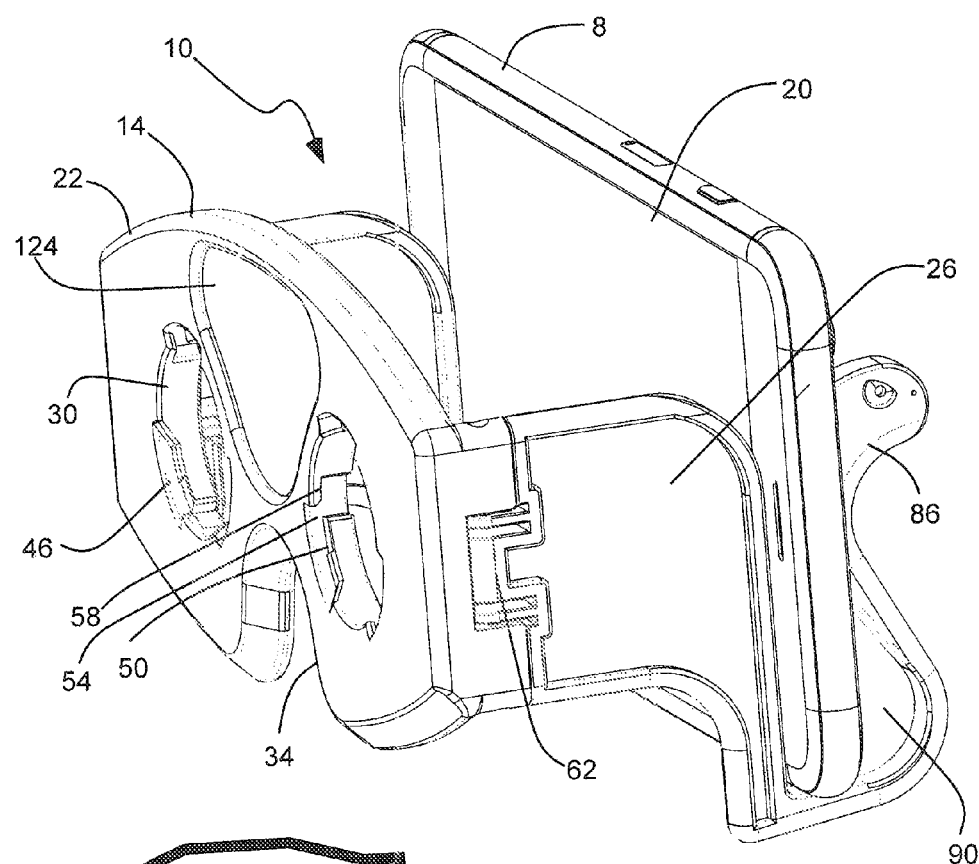
FIG. 1 is a perspective view of a stereoscopic image viewer system comprising a frame in combination with a handheld electronic device in accordance with an embodiment of the present invention.
Figure 2A:
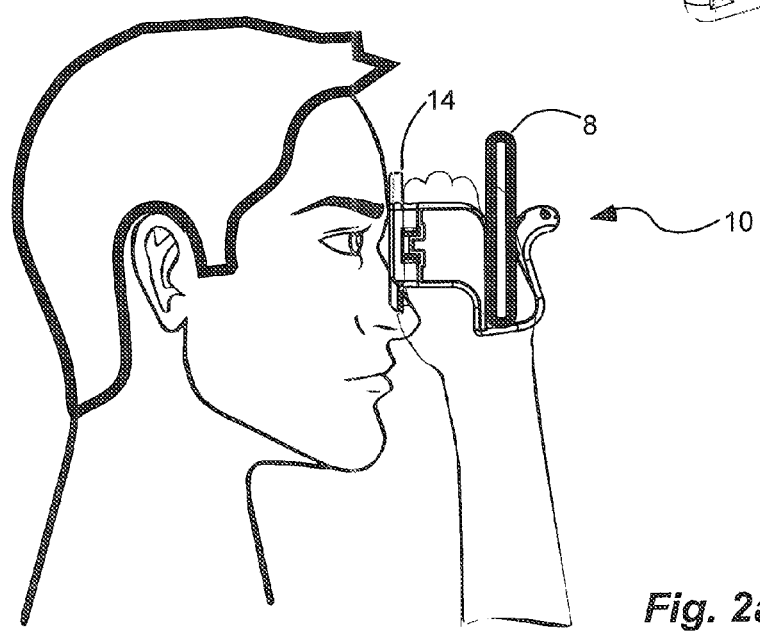
FIG. 2a is a side schematic view of the stereoscopic image viewer system of FIG. 1.
Figure 4A:
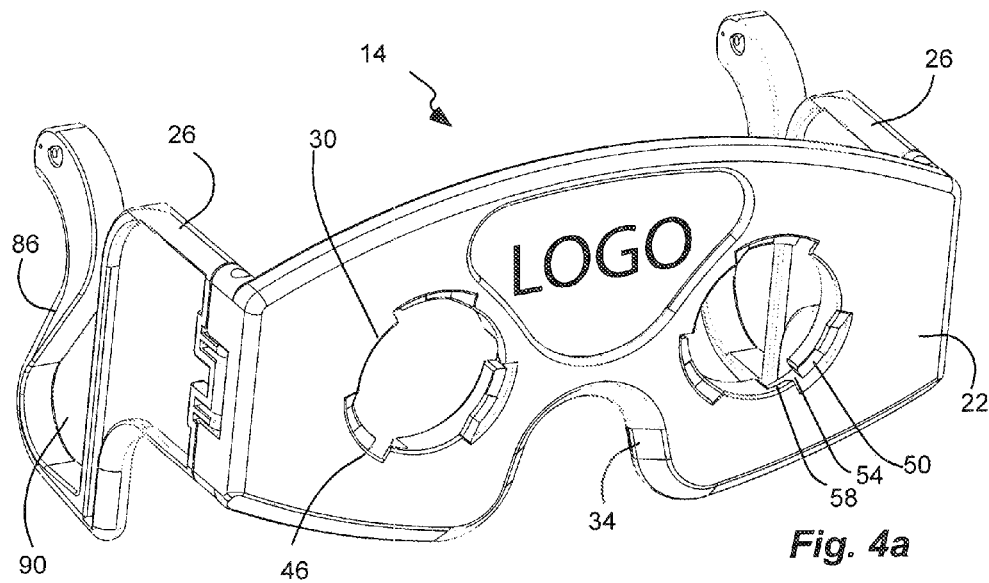
FIG. 4a is a front perspective view of the frame of FIG. 1, showing a pair of side arms in an extended or use configuration with respect to a faceplate.
Figure 4B:
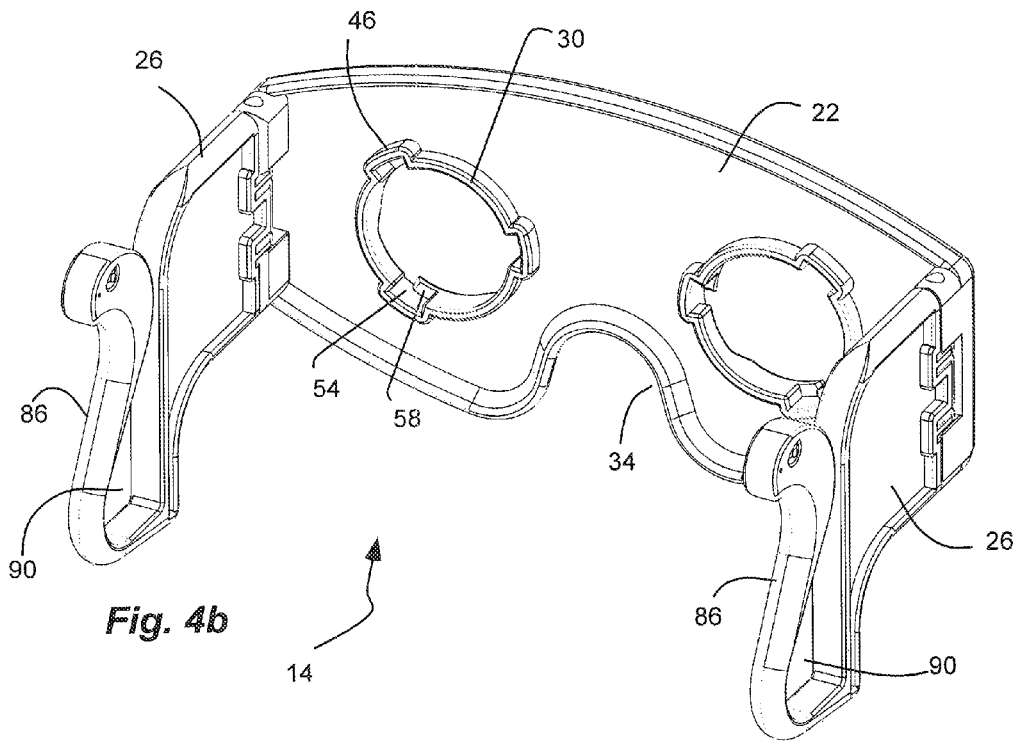
FIG. 4b is a rear perspective view of the frame of FIG. 1.
Figure 5:
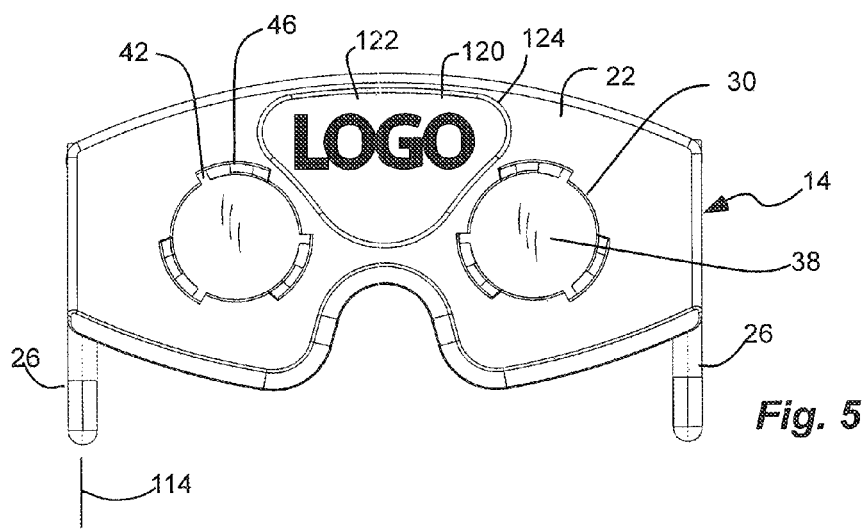
FIG. 5 is a front view of the frame of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "handheld electronic device" and "mobile device" are used interchangeably herein to refer broadly to a portable, hand-held electronic device, including by way of example, a cellular (cell) phone, a smart phone, a tablet computer or tablet, a global positioning system (GPS), a mobile media player, a gaming system, a video monitor, and the like. The handheld electronic device can be a cell phone; an MP3 player (iPod® or the like) or other digital music player; a gaming device (Nintendo® DS; PSP®; etc.); a camera; a global positioning system (GPS) system; a personal digital assistant (PDA); a DVD player; a portable television; a digital camera; a video camera; a portable computer (laptop computer, iPad®, or the like); an e-book or e-reader (Kindle®, Nook®, iPad®, Sony Reader™, or the like), etc. Such a device can have a display screen upon which data, information, media, etc. is viewed; one or more inputs, such as buttons, a touch screen, etc.; one or more outputs, such as the screen, a speaker, an audio jack, etc.; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. Mobile devices can have various different sizes, including different widths, lengths, or both. The mobile device can be rectangular with a smaller width and a greater height. By way of example, the mobile device can have a width or a height of approximately 55-80 mm. The portable electronic device can be mobile and transportable. The portable electronic device can be carried by a user, such as in a pocket or purse, and also can be held in the user's hand(s).

The term "cellular phone" is used broadly herein to refer to a cellular phone, a cell phone, a smart phone, phablet, etc. Such cellular phones can be portable, handheld communication devices that can include a speaker, a microphone, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone. The term cellular phone is used broadly herein to refer to phablets. Cellular phones can have various different sizes, including different widths, lengths, or both. The width can extend laterally, side-to-side; while the height can extend longitudinally, up-and-down. The cellular phone can be rectangular with a smaller width and a greater height. By way of example, the cellular phone can have a width of approximately 55-80 mm.

In addition, the terms "mobile device" and "cellular phone" are intended to refer to such mobile devices and cellular phones with a case, cover, skin, film, etc. thereon. Furthermore, the terms "back surface" and "back" are used interchangeably for such mobile devices or cellular phones, and are intended to refer to the actual back or back surface of such devices, and the back or back surface of any case, cover, skin, film, etc. disposed thereon.

The terms "business", "company" are used broadly and interchangeably herein to refer to an organization that provides a product or a service. The business, company or organization can have a name, logo, slogan trademark, service mark, etc. that is capable of identifying and/or distinguishing the business or company, or product or service, or both, or can otherwise be utilized to market, promote, and/or brand the business or company, or product or service, or both.

Description

The present invention provides a stereoscopic image viewer system in which a frame with a pair of lenses is coupled with a handheld electronic device, such as a cellular phone. The frame can have a faceplate and a pair of side arms that can fold flat against the faceplate for efficiency in shipping and storage. The side arms can be identical, for efficiency in manufacturing and assembly. In addition, the entire frame, including the lenses, can be formed of made entirely of injection molded polypropylene plastic. The side arms have flexible fingers that form a pair of slots to hold the cellular phone. The design of the frame is open so that it can fit any size cellular phone. (In addition, the open design can reduce claustrophobic effect and motion sickness.) The side arms have a flexing region in the plastic, which allows cellular phones of any thickness (for example, up to 15 mm) to slip into the slots, and which will hold the cellular phone tightly. In addition, the flexible fingers can have a co-molded rubber section on the fingers to grip the cellular phone so that it does not slip or slide out of the slots. The side arms are connected to the faceplate by hinges that include two flexing regions that allows the plastic to flex and snap into holes. The side arms have flat area on the top and bottom edges for the user to easily grip the frame with their hands. In addition, the frame can have lenses that can twist-to-lock. Furthermore, the frame can have a forehead pad on the faceplate that abuts to the user's forehead. The forehead pad can comprise a polyurethane dome label for branding and promotional products purposes.

The system and frame can be utilized with the Google Cardboard ecosystem of virtual reality viewers and apps. The frame will allow viewer to put a cellular phone in the frame, load a virtual reality app on the cellular phone, and experience virtual reality environments, games, simulations, etc., similar to other much more expensive virtual reality headsets with built-in screens. Google has created an open source manufacturing plan for the boxy cardboard version of these viewers, which is what most manufacturers follow. The present frame is injection-molded plastic viewer that is compatible with this system. The viewer/user puts their cellular phone into the slots created by the flexible side arms, which grips the cellular phone tightly, and then the viewer/user can look through the lenses at the phone screen. The virtual reality application creates a stereoscopic 3D effect, and the viewer/user can turn around in all directions to see different parts of the virtual reality scene. Although most viewers that are built for Google's "Works with Google Cardboard" program are cardboard, the present frame is formed of plastic.

As illustrated in FIGS. 1-22, a stereoscopic image viewer system, indicated generally at 10, in an example implementation in accordance with the invention is shown comprising an ocular frame device 14 in combination with a handheld electronic device 18 (such as a cellular phone) having a display screen 20. The frame 14 of the system 10 provides a simple, but quality, stereoscopic image viewer for use with an existing handheld electronic device 18 (such as a cellular phone). The frame can have a forehead pad that can double as a label for branding and promotional products purposes. In addition, the frame can have lenses that can twist-to-lock. In addition, the frame 14 can be injection molded, and can have interchangeable side arms that can be identical for ease of assembly. In addition, the frame 14 can have a snap-fit hinge between the side arms and a face plate for ease of assembly. Furthermore, the side arms can have co-molded rubber sections to grip the handheld electronic device.

As stated above, the frame 14 has a face plate 22 and a pair of side arms 26 that carry the handheld electronic device in a spared-apart relationship with respect to the face plate. The face plate 22 has a pair of lens sockets 30 and a nose indentation 34. The lens sockets 30 are spaced-apart to correspond to the spacing of a user's eyes. The nose indentation 34 extends inwardly into the face plate from a bottom of the face plate, and defines an upright orientation of the face plate. Thus, a user can hold the face plate to his or her face, with the sockets aligning with his or her eyes, and his or her nose received in the nose indentation. The face plate can be formed of plastic by injection molding. The face plate can have a front, which can face the user's face during use. The sockets can have an axis, or axial direction, defined through the face plate and perpendicular to the face plate, or front thereof.

A pair of lenses 38 is carried in the pair of lens sockets 30 of the face plate. The lenses 38 (FIGS. 15-17) can be transparent and can have opposite convex surfaces. The lenses 38 can be formed of plastic by injection molding. The frame 14 carries the lenses 38 and the handheld electronic device 18, and maintains the lenses 38 and the screen 20 of the handheld electronic device in a spaced-apart relationship so that the user can view the screen through the lenses.

Each of the pair of sockets 30 and each of the pair of lenses 38 can have a twist-to-lock coupling securing each lens in a respective or corresponding socket. The lenses 38 can have tabs 42 extending radially from a perimeter of the lens, and spaced-apart around a circumference of the lens. In one aspect, the lens can have three tabs. Similarly, the sockets 30 can have notches 46 extending radially into a perimeter of the socket, and also extending axially into the faceplate (such as from a front of the face plate), and also spaced-apart around a circumference of the socket. Thus, the notches 46 of the socket 30 and the tabs 42 of the lens 38 correspond to one another, and can be aligned with one another.

Each notch 46 has a floor 50 facing axially with respect to the socket. The sockets 30 also have undercuts 54 extending circumferentially from the notches 46. Each notch 46 has a ceiling 58 formed by the undercut that faces opposite the floor 50. The ceiling 58 and the floor 50 can be circumferentially off-set with respect to one another, such as to accommodate formation by injection molding. The tabs 42 can have a width (or circumferential length) that spans between both the ceiling 58 and the floor 50. A lens is placed or inserted axially into each socket with the tabs disposed in the notches, and then twisted or turned radially (about 10 degrees) to lock the lens into place in the face plate. The lenses are held in place by the ceiling and floor. No other fasteners are needed. In one aspect, the socket or notch can have a ramp down to the floor in the notch, or from an outer surface of the face plate to the floor, or to a platform slightly raise with respect to the floor. The platform can lock the tab into place. As the lens is rotated underneath the ceiling, the tab drops from the platform into the lower floor. There can be a tight clearance between the platform and the ceiling, tighter than between the floor and the ceiling, so the lenses are maintained floating between the floor (holding back side of tab) and the ceiling (holding front side of tab).

The pair of side arms 26 are pivotally coupled to the face plate 22 by a pair of hinges 62. The side arms 26 have proximal ends pivotally connected to the face plate 22, and extend to opposite distal ends. Thus, the side arms 26 can pivot between an open, extended and/or use orientation (as shown in FIGS. 1-8), and a closed, retracted, and/or folded position (as shown in FIGS. 18a-22). The foldable side arms allow the side arms to fold against the face plate 22 for compact storage. The pair of hinges 62 each have an axel 66 (FIG. 14) segmented into opposite sides of the axel, and defining a pair of knobs 66a and 66b. A pair of flexible tabs 70 extend transverse to the axel, and carry the pair of knobs. The knobs are displaceable towards and away from one another (and thus the axel is collapsible upon itself to lengthen and shorten) by the flexion of the pair of flexible tabs. In addition, the pair of hinges each have a pair of bores 74 (FIG. 9) opposing one another, aligned with one another, and spaced-apart from one another. The pair of bores receive the pair of knobs, respectively, so that the pair of knobs (and the axel) pivot in the pair of bores as the side arms pivot with respect to the face plate. The pair of knobs are displaceable towards one another (to shorten the axel) to be received within, or inserted between, the pair of bores, and then displace away from one another (to lengthen the axel) to be retained within the bores.

Figure 6:
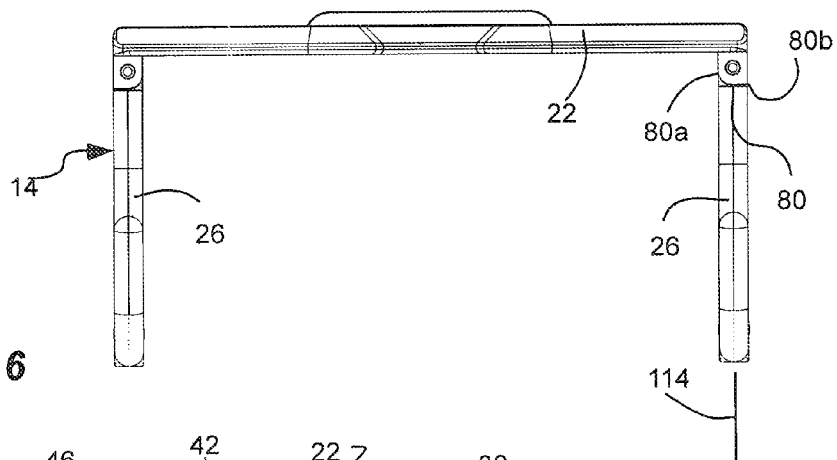
FIG. 6 is a bottom view of the frame of FIG. 1.
Figure 7:
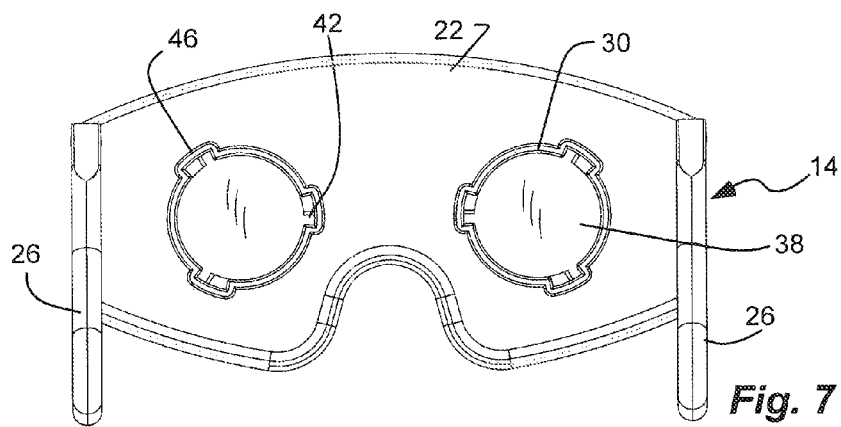
FIG. 7 is a rear view of the frame of FIG. 1.
Figure 15:
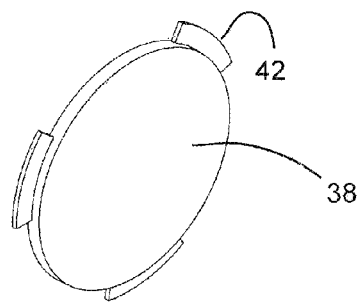
FIG. 15 is a perspective view of a lens of the frame of FIG. 1.
Figure 16:
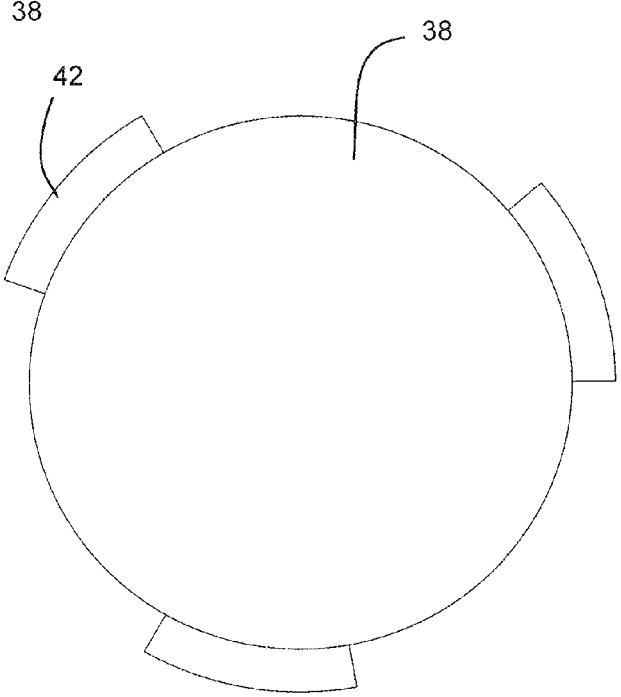
FIG. 16 is a front view of the lens of the frame of FIG. 1.
Figure 17:
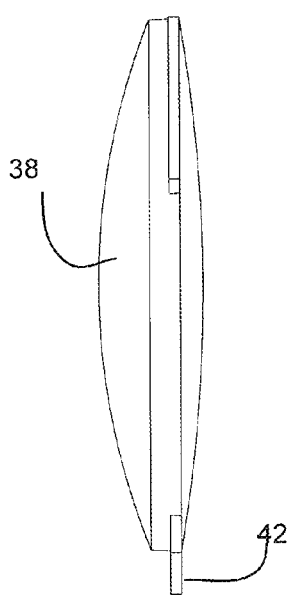
FIG. 17 is a side view of the lens of the frame of FIG. 1.
Figure 18A:
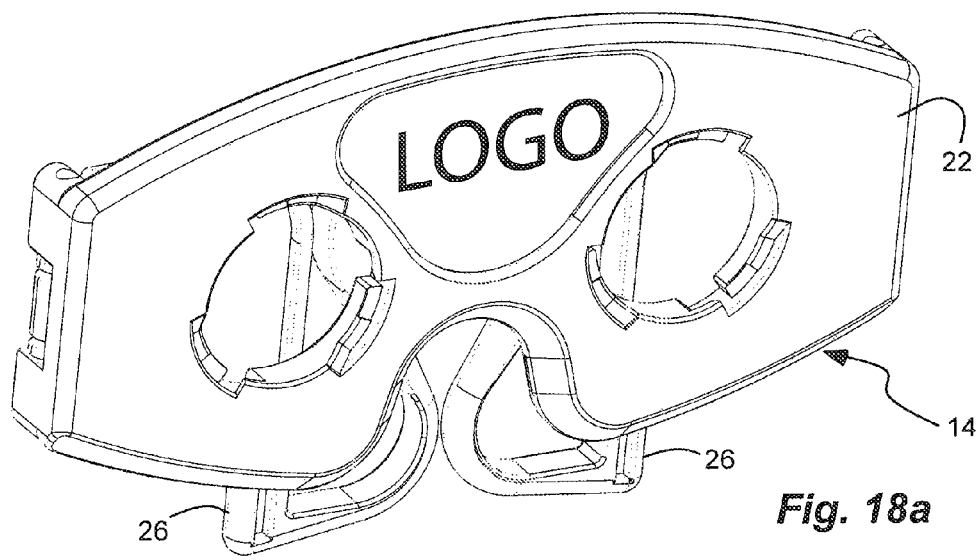
FIG. 18a is a front perspective view of the frame of FIG. 1, showing the pair of side arms in a retracted or storage configuration with respect to the faceplate.
Figure 18B:
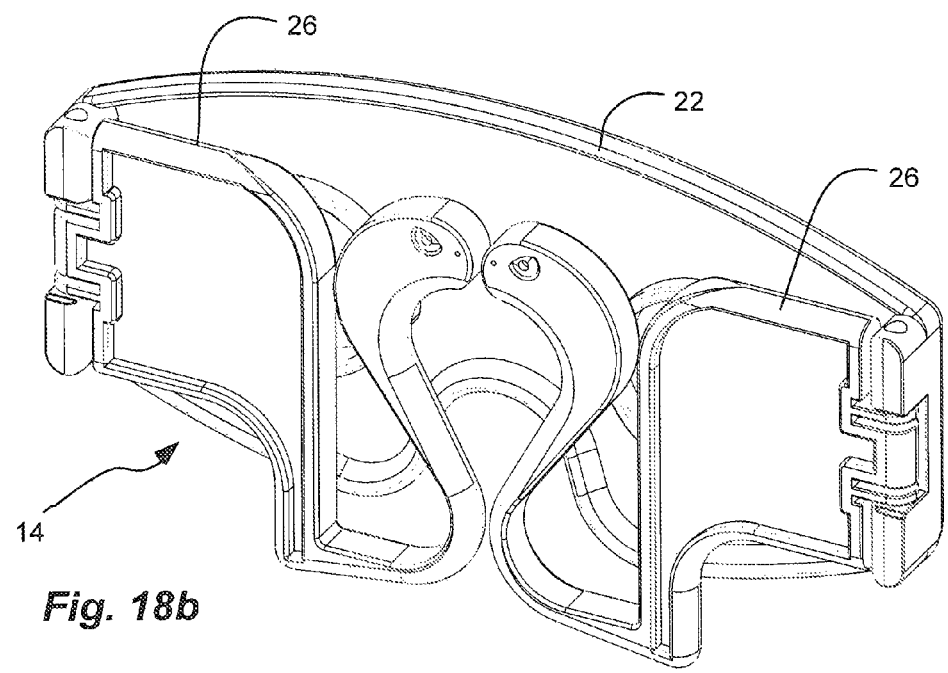
FIG. 18b is a rear perspective view of the frame of FIG. 1.
Figure 19:
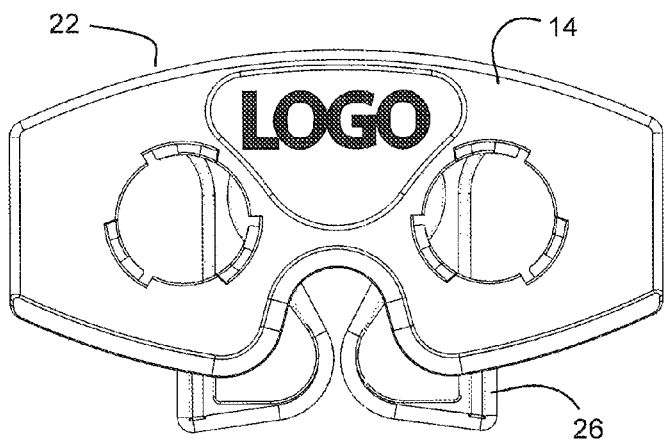
FIG. 19 is a front view of the frame of FIG. 1.
Figure 20:
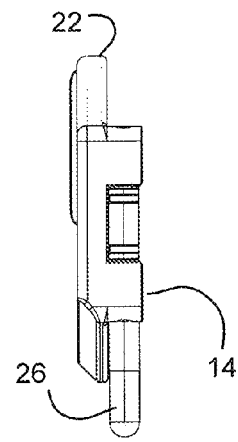
FIG. 20 is a side view of the frame of FIG. 1.
Figure 21:
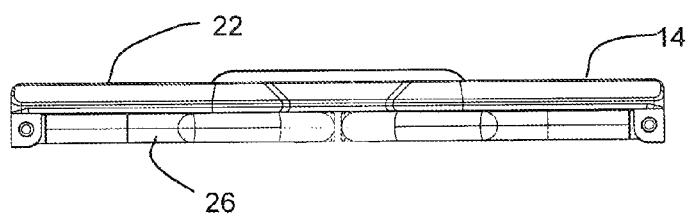
FIG. 21 is a bottom view of the frame of FIG. 1.
Figure 22:
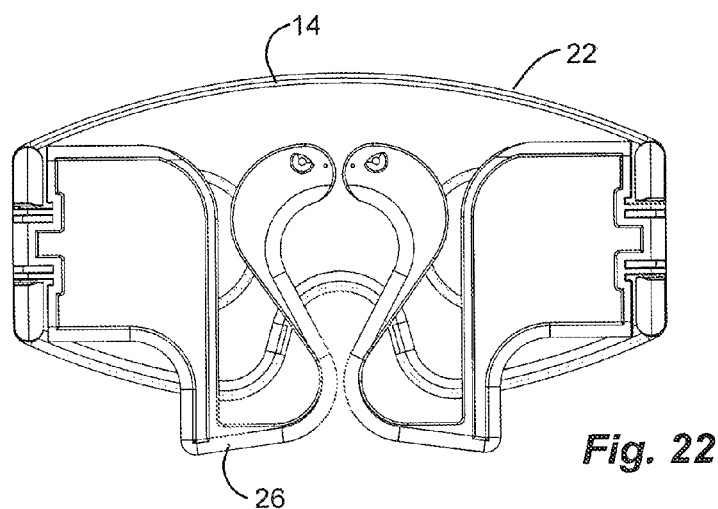
FIG. 22 is a rear view of the frame of FIG. 1.

In one aspect, the pair of bores 74 can be carried by the face plate 22, and are disposed in a pair of spaced-apart shoulders 78 and opposing one another and facing a notch 82 defined between the pair of shoulders. The pair of shoulders 78 can extend rearward from the face plate. The pair of flexible tabs 70 can extend from the proximal ends of the pair of side arms 26 with the knobs facing away from one another and displacable inwardly towards one another about the flexible tabs to be received in the notch 82 between the pair of shoulders 78. The pair of tabs 70 can be elastic and biased outwardly to maintain the pair of knobs 66a and 66b in the pair of bores. In another aspect, the shoulders 78 can have an outer wall 80 with an inner corner 80a that is arcuate and an outer corner 80b that is flat or pointed, as shown in FIG. 6. Thus, the side arms 26 can pivot in towards the face plate 22 about the curved inner corner 80a to retract to the storage orientation, and abut to the flat or pointed outer corner 80b in the open, extended and/or use configuration to maintain the side arms perpendicular to the face plate. Thus, the shape of the outer all of the shoulders allows the side arms to pivot 90 degrees, from an angle flat with the front plate, to 90 degrees perpendicular to the front plate. In addition, the side arms 26 have a length that is half or less than the width of the face plate so that both side arms can close towards one another over the face plate without overlapping.

As described above, the side arms 26 carry the handheld electronic device 18, and have proximal and distal ends. The distal ends of the pair of side arms 26 have flexible fingers 86 oriented upright with respect to the face plate 22, and defining a pair of slots 90 oriented upright between the flexible fingers and the pair of side arms to removably receive the handheld electronic device, as shown in FIGS. 3a and 3b. The flexible fingers 86 have proximal ends 94 connected to the pair of side arms and extending to distal free ends 98. The distal free ends 98 of the pair of flexible fingers 86 are movable towards and away from the pair of side arms to narrow and widen, respectively, the pair of slots 90. The flexible fingers 86 are elastic and biased towards the pair of side arms to pinch the handheld electronic device 18 in the slots 90, as shown in FIG. 3b. The distal free ends 98 of the flexible fingers 86 extend substantially to tops of the pair of side arms 26, so that the tops of the side arms and the distal free ends 98 of the fingers 86 are at substantially the same elevational height to provide a secure grip on the handheld electronic device. The flexible fingers 86 can be thicker at the proximal and distal ends 94 and 98, and thinner at intermediate location defining flexible regions 102 about which the distal free ends move or pivot. The flexible fingers 86 can be serpentine, and can curve away from the pair of side arms 26 at the proximal ends 94 thereof, curve back towards the pair of side arms at an intermediate location defining a contact point 106, and curve away from the pair of side arms to the distal free ends 98. Thus, the serpentine shape of the fingers can create an enlarged opening to the slots 90 to facilitate insertion and removal of the handheld electronic device. In addition, the distal free ends 98 of the flexible fingers 86 can each have an interior section 110 facing inwardly towards the slot 90, and formed of a different material than the flexible fingers. In one aspect, the interior sections 110 can be co-molded rubber to better grip the handheld electronic device.

In one aspect, the pair of side arms 26 can be the same shape and size, and thus can be interchangeable between each side of the face plate 22. Each of the pair of side arms 26 can extend in a plane 114 (FIGS. 5 and 6) defined between the proximal and distal ends of the pair of side arms. And each of the pair of side arms 26 can be symmetrical about the plane 114. Thus, each opposite half of the side arm is a mirror image of the opposite half.

Furthermore, the frame 14 and/or the face plate 22 can have a forehead pad 120 on a forward surface of the face plate, opposite the pair of arms. The forehead pad 120 can abut to a user's forehead during use and can provide a softer material than the face plate. In addition, the forehead pad 120 can provide a label for branding and promotional products purposes. In one aspect, the forehead pad can include or can be a squat dome 122 formed of a different material than the face plate, such as polyurethane. The dome 122 can have a broad, flat shape with an outfacing surface with a flat and smooth center surrounded by a radius perimeter. In addition, the dome can have indicia, such as logo, indicative of or representing a business, a product, or both, carried thereby and visible to a viewer.

In one aspect, the outfacing surface of the dome can extend beyond an outer surface of the face plate, as shown in FIG. 12a. The face plate can have a recess 124 in an outer surface thereof, and the forehead pad 120 or dome 122 can be disposed in the recess. The forehead pad or dome can have a thickness greater than a depth of the recess so that the outfacing surface can extend beyond the outer surface of the face plate. In another aspect, the outfacing surface of the dome can be flush or level with an outer surface of the face plate, as shown in FIG. 12b. An adhesive film 28 (FIG. 11b) can adhere the forehead pad 120 and/or the polyurethane dome 122 to the face plate 22. In one aspect, the forehead pad 120 and/or the polyurethane dome 122 can be translucent or transparent, so that the surface of the face plate can be visible through the dome. In another aspect, a graphic layer 132 (FIG. 11b) can be disposed between the face plate 22 and the polyurethane dome, and visible through the polyurethane dome.

As stated above, in one aspect, the dome 122 can be a polyurethane dome. The dome can 122 include the adhesive film 128 adhered to the surface of the face plate 22. The adhesive film can use a chemical adhesive to adhere. The adhesive can be selected to provide sufficient adhesion between the dome and face plate without separating as the frame is repeatedly used, such as insertion and removable from a case or pocket. The adhesive can also be selected so that the dome can be removed if desired. Thus, the adhesive film can include a releasable adhesive, as opposed to a permanent adhesive. The adhesive film can be a repositionable adhesive film releasable and repositionably adhered to the face plate. The adhesive film can have an adhesive bond between the dome and the face plate. The adhesive film also has a contact surface between the adhesive film and the face plate. Furthermore, the adhesive and/or the adhesive film can be substantially transparent, or at least translucent, so that the surface of the face plate can be visible through the dome. The adhesive and/or adhesive layer can be a removable 3M Controltac™ adhesive.

The adhesive film 128 can be disposed on a substrate. The substrate can also be a film. In one aspect, the substrate can be substantially non-absorbent. The substrate can provide a surface, such as an upper or inner surface opposite the adhesive that can be printable. In addition, the substrate can be substantially transparent, or at least translucent, so that the surface of the face plate can be visible through the dome, and the substrate. The substrate can be a printed 3M® graphics vinyl. Alternatively, the substrate can be a polyester film. The substrate can be any laminated (non-porous) substrate, including: polypropylene (PP), polyvinyl chloride (PVC), polyethylene terephthalate (PET), acrylonitrile-butadiene-styrene (ABS), polyester, regular sticker paper, vinyl, or tin metal (foil). Alternatively, the substrate can have be other films with other characteristics, such as reflective, metal shine, textured, etc.

The dome 122 can be affixed to the adhesive film 128 and/or the substrate, and adhered to the face plate by the adhesive film. The dome 122 can be secured to the adhesive film and/or substrate. The dome can have a broad, flat, squat shape with an outfacing surface that faces and contacts the user's or viewer's forehead. The outfacing surface can be smooth and flat and parallel with the adhesive layer. In addition, the outfacing surface can be surrounded by a radius perimeter. Thus, the perimeter of the outfacing surface curves toward the adhesive layer and face plate. In one aspect, all of the outfacing surface can be flat and smooth and continuous between the radiused perimeter. The dome and/or outward facing surface can be tacky to cling to the user's forehead or another surface, such as by mechanical or specific adhesion. Furthermore, the dome can be substantially transparent, or at least translucent, so that the surface of the face plate can be visible through the dome.

The dome 122 or the outfacing surface thereof can provide a non-slip surface that can engage a user's forehead or a support surface. Thus, the outfacing surface can be sufficiently tacky to cling to the user's forehead, or other support surface, but sufficiently smooth or slippery to slid in and out of cases, pockets of clothing and clothing accessories. The tackiness of the outfacing surface can be obtained through various factors, which can include material, hardness/softness, and coefficient of friction. As described above, the dome can be formed of polyurethane. The polyurethane can be formed by combining a polyol with a catalyst or hardener. In one aspect, the ratio of polyol to catalyst can be between 1:0.63 to 0.85, so that there is more polyol than catalyst. In another aspect, the ratio of polyol to catalyst can be between 1:0.63 to 0.75. Typical polyurethane is obtained by mixing polyol and catalyst in a 1:1 ratio. In addition, in one aspect, the outfacing surface or dome can have a hardness between 10 and 35 Shore D. In another aspect, the outfacing surface or dome can have a hardness between 12 and 21 Shore D. In another aspect, the outfacing surface or dome can have a hardness between 12 and 18 Shore D. Other non-tacky stickers or decals typically can have a hardness of 60 Shore D or harder. Furthermore, the outfacing surface can have a coefficient of friction of between 0.3 and 0.1 in accordance with ASTM D 1894. Thus, the outwardly facing surface can be tacky to cling to the forehead, or other support surface, but smooth to facilitate insertion and removal from a pocket or purse.

A strength of the adhesive bond between the adhesive film and the face plate can be greater than a tacky cling between the outfacing surface of the dome and the forehead or other support surface. Thus, the dome remains on the face plate while the frame and dome are removed from the forehead or other support surface. In addition, the contact surface between the adhesive layer of the dome and the face plate can be greater than the outfacing surface of the dome contacting the forehead or other support surface to further retain the dome on the face plate as the frame and dome are removed from the forehead or other support surface. Furthermore, the contact surface between the adhesive layer of the dome and the face plate can have a perimeter greater than and circumscribing a perimeter of the outfacing surface of the dome that contacts the forehead or other support surface.

A graphic layer 132 can be disposed between the adhesive film 128 and the dome 122, or between the substrate and the dome. The graphic layer can include ink disposed on or printed on the substrate. For example, the graphic layer can be an aqueous based inkjet ink. The graphic layer can include indicia, such as a logo, a picture, etc. In addition, the graphic layer can include directions for use, orientation, care, etc. Furthermore, the graphic layer can be or can include other inclusions, as described in greater detail below. The graphic layer can be visible through the dome. The graphic layer and/or inclusion can be smaller or can have a smaller size than the substrate and dome such that the graphic layer and inclusion are surrounded by a perimeter of the dome and substrate. In one aspect, the graphic layer can include indicia that is indicative of a business, company or organization, such as a name, logo, slogan, trademark, service mark, etc. that is capable of identifying and/or distinguishing the business or company, or product or service, or both, or can otherwise be utilized to market, promote, and/or brand the business or company, or product or service, or both.

The dome can have a triangular shape with rounded corners, as shown. Alternatively, other shapes are possible, such as circular or scripted (i.e. shaped-like letters). In one aspect, the dome is smaller than the surface of the frame to which it is applied. In addition, the dome can have a thickness between 1-2 mm in one aspect, and 1.2-1.5 mm in another aspect. The thickness of the dome is dimensionally stable so that the dome is not generally compressible. The dome can have a stiffness with a self-supporting flat layer, yet can be flexible enough to be bent to conform to a curvature of the face plate or frame (if present). The adhesive layer can be sufficient to overcome the stiffness of the dome and maintain the curved or bent nature of the non-skid label when adhered to the face plate or frame (if curved). In addition, the dome can be elastic to return to its self-supporting flat layer. The dome and the outfacing surface can be substantially solid, flat, smooth and continuous.

As indicated above, the graphic layer can be or can include an inclusion. The inclusions can be embedded in the dome. For example, the graphic layer can be an etched metallic layer. The metallic layer can be etched to form the indicia. Other inclusions can be an LED (or other light source) and a battery power source; a hologram or lenticular artwork; an RFID computer chip or tag; a mirror; one or more gems or faux gems; etc. For example, an LED can be electrically coupled to a battery. The LED may remain continuously activated or lit. Alternatively, the LED may be activated, or the leads for the LED selectively contacted by the battery, such as by pressure applied to the non-skid label. Alternatively, a light sensor can be electrically coupled between the battery and the LED to activate the LED in low light conditions. Other electronics can be included for special effects, such as flashing, etc. It will be appreciated that multiple lights or LEDs of one or more color can be included or embedded in the dome. As another example, a gem or faux gem can be embedded in the dome. The inclusion(s) can be disposed on the adhesive film and/or substrate, and surrounded by the material of the dome so that the inclusion projects into the dome. Thus, the inclusions can be inclusions for the dome and/or the graphics layer.

The dome can also include inclusions embedded therein. For example, the dome can include a scented material, such as a scented oil, that is permeable through the polyurethane material of the dome. In addition, the dome can be colored and translucent. Furthermore, the dome can include a florescent material.

In another aspect, the dome can have an opaque dome with a graphic layer, such as printing, on the outfacing surface. The opaque dome can have a color to match or complement the frame.

As mentioned above, the dome can have any shape. In addition, the dome can be "scripted," i.e. shaped as particular letters, symbols, etc.; which can be interconnected or can be one or more separate and discrete portions.

As discussed above, the dome or outfacing surface can have a radius perimeter. The dome can be made by pouring the polyurethane material on top of the substrate and graphic layer to form the dome. Thus, the radius perimeter is obtained by individual pouring each dome, without stamping or cutting the dome from a continuous layer. The graphic layer can be printed on the substrate having the adhesive film opposite the graphic layer. The graphic layer can be a discrete graphic contained within the pad or dome, as opposed to a continuous graphic.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:
1. A stereoscopic image viewer device comprising a frame configured to be physically coupled to a handheld electronic device having a display screen, the frame comprising:
 a) a face plate having a pair of lens sockets and a nose indentation, the nose indentation extending inwardly from a bottom of the face plate defining an upright orientation;
 b) a pair of lenses carried in the pair of lens sockets of the face plate;
 c) a pair of side arms coupled to the face plate and having a pair of slots configured to receive the handheld electronic device, the pair of side arms having proximal ends pivotally connected to the face plate and extending to distal ends; and
 d) the distal ends of the pair of side arms having flexible fingers oriented upright with respect to the face plate and defining a pair of slots oriented upright between the flexible fingers and the pair of side arms configured to removably receive the handheld electronic device;
 e) the flexible fingers having proximal ends connected to the pair of side arms and extending to distal free ends, are serpentine and curve away from the pair of side arms at the proximal ends thereof, curve back towards the pair of side arms at an intermediate location defining a contact point, and curve away from the pair of side arms to the distal free ends thereof;

f) the distal free ends of the pair of flexible fingers being movable towards and away from the pair of side arms to narrow and widen, respectively, the pair of slots;

g) the flexible fingers being elastic and biased towards the pair of side arms configured to pinch the handheld electronic device in the slots; and h) the distal free ends of the fingers extending substantially to tops of the pair of side arms.

2. The device in accordance with claim 1, wherein the outfacing surface of the dome extends beyond an outer surface of the face plate.

3. The device in accordance with claim 1, further comprising:
a recess in an outer surface of the face plate; and
the forehead pad being disposed in the recess.

4. The device in accordance with claim 3, wherein the forehead pad extends out of the recess.

5. The device in accordance with claim 1, wherein the squat dome of the forehead pad is a polyurethane dome.

6. The device in accordance with claim 5, further comprising:
an adhesive film adhering the polyurethane dome to the face plate.

7. The device in accordance with claim 5, wherein the polyurethane dome is translucent or transparent; and further comprising a graphic layer disposed between the face plate and the polyurethane dome, and visible through the polyurethane dome.

8. The device in accordance with claim 1, wherein each of the pair of sockets and each of the pair of lenses has a twist-to-lock coupling comprising:
tabs extending radially from a perimeter of the lens and spaced-apart around a circumference of the lens;
notches extending radially into a perimeter of the socket and extending axially into the faceplate and spaced-apart around a circumference of the socket, and corresponding to the tabs of the lens, each notch having a floor facing axially with respect to the socket;
undercuts extending circumferentially from the notches, each notch having a ceiling formed by the undercut facing opposite the floor; and
the tabs of the lens being insertable into the notches axially and turned radially so that each tab is held between the ceiling and the floor of the notch.

9. The device in accordance with claim 1, further comprising:
a) the pair of side arms being pivotally coupled to the face plate by a pair of hinges, the pair of side arms having proximal ends pivotally connected to the face plate and extending to distal ends;
b) the distal ends of the pair of side arms having flexible fingers oriented upright with respect to the face plate and the pair of slots being oriented upright between the flexible lingers and the pair of side arms;
c) the flexible fingers having proximal ends connected to the pair of side arms and extending to distal free ends;
d) the distal free ends of the pair of flexible fingers being movable towards and away from the pair of side arms to narrow and widen, respectively, the pair of slots;
e) the flexible fingers being elastic and biased towards the pair of side arms configured to pinch the handheld electronic device in the slots; and
f) the distal free ends of the fingers extending substantially to tops of the pair of side arms.

10. The device in accordance with claim 9, further comprising:
the flexible fingers being thicker at the proximal and distal ends, and thinner at intermediate location defining a flexible region about which the distal ends moe.

11. The device in accordance with claim 9, wherein the flexible fingers are serpentine and curve away from the pair of side arms at the proximal ends thereof, curve back towards the pair of side arms at an intermediate location defining a contact point, and curve away from the pair of side arms to the distal free ends thereof.

12. The device in accordance with claim 9, further comprising:
the pair of side arms being the same shape and size, and interchangeable between each side of the face plate; wherein each of the pair of side arms extends in a plane defined between the proximal and distal ends of the pair of side arms, and each of the pair of side arms being symmetrical about the plane.

13. The device in accordance with claim 1, further comprising: a forehead pad comprising a squat dome formed of a different material than the face plate being disposed on the face plate opposite the pair of arms, the dome having a broad, flat shape with an outfacing surface with a flat and smooth center surrounded by a radius perimeter.

14. A stereoscopic image viewer device comprising a frame configured to be physically coupled to a handheld electronic device having a display screen, the frame comprising:
a) a face plate having a pair of lens sockets and a nose indentation, the nose indentation extending inwardly from a bottom of the face plate defining an upright orientation;
c) each of the pair of sockets and each of the pair of lenses has a twist-to-lock coupling comprising:
i) tabs extending radially from a perimeter of the lens and spaced-apart around a circumference of the lens;
ii) notches extending radially into a perimeter of the socket and extending axially into the faceplate and spaced-apart around a circumference of the socket, and corresponding to the tabs of the lens, each notch having a floor facing axially with respect to the socket;
iii) undercuts extending circumferentially from the notches, each notch having a ceiling formed by the undercut facing opposite the floor; and
iv) the tabs of the lens being insertable into the notches axially and turned radially so that each tab is held between the ceiling and the floor of the notch; further comprising:
d) a pair of side arms pivotally coupled to the face plate by a pair of hinges, the pair of side arms having proximal ends pivotally connected to the face plate and extending to distal ends;
e) the distal ends of the pair of side arms having flexible fingers oriented upright with respect to the face plate and defining a pair of slots oriented upright between the flexible fingers and the pair of side arms configured to removably receive the handheld electronic device;
f) the flexible fingers having proximal ends connected to the pair of side arms and extending to distal free ends, wherein the flexible fingers are serpentine and curve away from the pair of side arms at the proximal ends thereof, curve backtowards the pair of side arms at an intermediate location defining a contact point, and curve away from the pair of side arms to the distal free ends thereof;

g) the distal free ends of the pair of flexible fingers being movable towards and away from the pair of side arms to narrow and widen, respectively, the pair of slots;
h) the flexible fingers being elastic and biased towards the pair of side arms configured to pinch the handheld electronic device in the slots; and
i) the distal free ends of the fingers extending substantially to tops of the pair of side arms.

15. The device in accordance with claim 1, further comprising:
the flexible fingers being thicker at the proximal and distal ends, and thinner at intermediate location defining flexible regions about which the distal free ends move.

16. The device in accordance with claim 14, further comprising:
the pair of hinges each having an axel segmented into opposite sides of the axel and defining a pair of knobs, a pair of flexible tabs extending transverse to the axel and carrying the pair of knobs, the knobs being displaceable by the flexion of the pair of flexible tabs, and the pair of hinges each having a pair of bores opposing one another and receiving the pair of knobs, and the pair of knobs being displaceable to be received within the pair of bores, and pivoting within the pair of bores.

17. The device in accordance with claim 14, further comprising:
the pair of side arms being the same shape and size, and interchangeable between each side of the face plate; wherein each of the pair of side arms extends in a plane defined between the proximal and distal ends of the pair of side arms, and each of the pair of side arms being symmetrical about the plane.

18. The device in accordance with claim 14, further comprising:
a forehead pad comprising a squat dome formed of a different material than the face plate being disposed on the face plate opposite the pair of arms.

19. A stereoscopic image viewer system comprising a frame in combination with a handheld electronic device having a display screen, the frame comprising:
a) a face plate having a pair of lens sockets and a nose indentation, the nose indentation extending inwardly from a bottom of the face plate defining an upright orientation;
b) a pair of lenses carried in the pair of lens sockets of the face plate;
c) each of the pair of sockets and each of the pair of lenses has a twist-to-lock coupling comprising:
 i) tabs extending radially from a perimeter of the lens and spaced-apart around a circumference of the lens;
 ii) notches extending radially into a perimeter of the socket and extending axially into the faceplate and spaced-apart around a circumference of the socket, and corresponding to the tabs of the lens, each notch having a floor facing axially with respect to the socket;
 iii) undercuts extending circumferentially from the notches, each notch having a ceiling formed by the undercut facing opposite the floor; and
 iv) the tabs of the lens being insertable into the notches axially and turned radially so that each tab is held between the ceiling and the floor of the notch;
d) a pair of side arms pivotally coupled to the face plate by a pair of hinges, the pair of side arms having proximal ends pivotally connected to the face plate and extending to distal ends;
e) the distal ends of the pair of side arms having flexible fingers oriented upright with respect to the face plate and defining a pair of slots oriented upright between the flexible fingers and the pair of side arms to removably receive the handheld electronic device;
f) the flexible fingers having proximal ends connected to the pair of side arms and extending to distal free ends;
g) the distal free ends of the pair of flexible fingers being movable towards and away from the pair of side arms to narrow and widen, respectively, the pair of slots;
h) the flexible fingers being elastic and biased towards the pair of side arms to pinch the handheld electronic device in the slots;
i) the distal free ends of the fingers extending substantially to tops of the pair of side arms;
j) the flexible fingers being thicker at the proximal and distal ends, and thinner at intermediate location defining a flexible region about which the distal free ends move;
k) the flexible fingers being serpentine and curving away from the pair of side arms at the proximal ends thereof, curving back towards the pair of side arms at an intermediate location defining a contact point, and curving away from the pair of side arms to the distal free ends thereof;
l) the distal free ends of the flexible fingers each having an interior section facing inwardly towards the slot and formed of a different material than the flexible fingers;
m) the pair of hinges each having an axel segmented into opposite sides of the axel and defining, a pair of knobs, a pair of flexible tabs extending transverse to the axel and carrying the pair of knobs, the knobs being displaceable by the flexion of the pair of flexible tabs, and the pair of hinges each having a pair of bores opposing one another and receiving the pair of knobs, and the pair of knobs being displaceable to be received within the pair of bores, and pivoting within the pair of bores;
n) the pair of side arms being the same shape and size, and interchangeable between each side of the face plate, and each of the pair of side arms extending in a plane defined between the proximal and distal ends of the pair of side arms, and each of the pair of side arms being symmetrical about the plane;
o) a recess in an outer surface of the face plate;
p) a forehead pad comprising a squat dome formed of a different material than the face plate being disposed in the recess of the face plate opposite the pair of arms, the dome having a broad, flat shape with an outfacing surface with a flat and smooth center surrounded by a radius perimeter;
q) the forehead pad extending out of the recess; and
r) the squat dome of the forehead pad being a polyurethane dome.

* * * * *